United States Patent
Higuchi

(10) Patent No.: US 6,275,013 B1
(45) Date of Patent: Aug. 14, 2001

(54) SWITCHING POWER SUPPLY EMPLOYING AN INTERNAL RESISTANCE IN SERIES WITH A ZENER DIODE TO STABILIZE A DC OUTPUT

(75) Inventor: Yoshio Higuchi, Osaka (JP)

(73) Assignee: Funai Electric Co., Ltd., Daito (JP)

(*) Notice: Subject to any disclaimer, the term of this patent is extended or adjusted under 35 U.S.C. 154(b) by 0 days.

(21) Appl. No.: 09/621,968

(22) Filed: Jul. 21, 2000

(51) Int. Cl.⁷ ........................................ G05F 1/613
(52) U.S. Cl. .................... 323/222; 323/231; 323/266
(58) Field of Search .................................. 323/222, 224, 323/231, 266, 282, 351

(56) References Cited

U.S. PATENT DOCUMENTS 3,619,758  *  11/1971  Deranian .......................... 323/222
4,322,787  *  3/1982   Kravs ............................... 323/266
4,549,254  *  10/1985  Kissel .............................. 323/224
5,886,885  *  3/1999   Fujie ................................ 323/222
5,949,222  *  9/1999   Buono ............................. 323/222

FOREIGN PATENT DOCUMENTS 10-98565    4/1998  (JP) ........................ H02M/3/155

* cited by examiner

Primary Examiner—Jeffrey Sterrett
(74) Attorney, Agent, or Firm—Crowell & Moring, L.L.P.

(57) ABSTRACT

A switching power supply includes a rectifying and smoothing circuit 6 coupled to an inductor L1 and a zener diode D2 coupled to the output of the rectifying and smoothing circuit 6. An internal resistor on the inductor L1 side viewed through the rectifying and smoothing circuit 6 is employed as a serial resistor for generating the voltage drop which is required for the zener diode D2 to absorb voltage fluctuation, whereby the voltage of the DC output 22 is stabilized.

6 Claims, 2 Drawing Sheets

SWITCHING POWER SUPPLY EMPLOYING AN INTERNAL RESISTANCE IN SERIES WITH A ZENER DIODE TO STABILIZE A DC OUTPUT

BACKGROUND OF THE INVENTION

The present invention relates to a switching power supply which switches current flowing through an inductor by using a switching element thereby to obtain a boosted DC output.

A tuner provided in a television etc. employs an arrangement wherein a tuning frequency is changed by changing a tuning voltage. The tuning voltage is generally a voltage slightly exceeding 30 volt at the maximum. Thus, the tuning voltage cannot be generated from the operation power supply in a vehicle-mounted television having the operation power supply of 12 volt. Accordingly, in this case, a booster circuit is provided in order to obtain the DC voltage slightly exceeding 30 volt used for generating the tuning voltage. FIG. 2 shows the prior art of the booster circuit which is generally configured by the known arrangement of a chopper type booster circuit. That is, a transistor Q7 performing the switching operation in accordance with the output of an oscillation circuit 53 is provided on the output side of an inductor L7. The oscillation of the oscillation circuit 53 is controlled by the output of an error detection circuit 54 for detecting error voltage of the DC output, whereby the voltage of the DC output is stabilized (this technique is hereinafter called a the first prior art).

One of the prior arts for generating the tuning voltage is proposed in the Unexamined Japanese Utility Model No. Sho 62-178619. FIG. 3 is a block diagram showing this technique. This technique will be explained with reference to the figure. In this technique, a positive power supply +B is introduced to a zener diode D7 through a serial resistor R21 for voltage drop, thereby obtaining DC output necessary for generating the tuning voltage from the cathode of the zener diode D7. A tuning voltage limiting circuit 51 for limiting the voltage to a predetermined voltage is provided between the cathode of the zener diode D7 and a PWM circuit 52 for generating the tuning voltage. When receiving a particular band, the voltage of the DC output supplied to the PWM circuit 52 is limited to the predetermined voltage, whilst when receiving other bands, the voltage supplied to the PWM circuit 52 is made equal to the cathode voltage of the zener diode D7 (this technique is hereinafter called as the second prior art).

However, according to the first prior art, since the error detection circuit 54 for detecting the error voltage of the DC output is required in order to stabilize the voltage of the DC output, there arises a problem that the circuit configuration becomes complicated. According to the second prior art, the serial resistor R21 and the zener diode D7 are employed in order to stabilize the voltage supplied to the tuning voltage limiting circuit 51. Thus, since the two elements are required for stabilizing the voltage, the number of the elements is increased. In this case, since the serial resistor R21 serves as an element for causing the voltage drop for absorbing the voltage variation, there arises a problem that the serial resistor R21 can not be eliminated.

SUMMARY OF THE INVENTION

Accordingly, the present invention has been made in view of the aforesaid problems of the prior arts, and an object of the present invention recited in claim 1 is to provide a switching power supply which can stabilize the output voltage by using only a zener diode without using a serial resistor for voltage drop, in the arrangement that unstable voltage is generated by using a switching element and the unstable voltage is stabilized by using a zener diode and the arrangement that an internal resistance of a switching circuit for generating the unstable voltage is used as a serial resistor for generating voltage drop for absorbing voltage variation thereby to eliminate an error detection circuit.

In addition to the aforesaid object, another object of the invention is to provide a switching power supply which can simplify the circuit arrangement of a block for switching a switching element in a manner that the output of an auxiliary coil magnetically coupled to an inductor is introduced to the switching element thereby to switch the switching element.

In addition to the aforesaid object, still another object of the invention is to provide a switching power supply which can reduce the ripple component of the DC output sufficiently by providing a n type smoothing circuit.

In addition to the aforesaid object, still another object of the invention is to provide a switching power supply which can simplify the arrangement of a block for generating tuning voltage by using an operation power supply for a tuning voltage generation circuit.

In addition to the aforesaid object, still another object of the invention is to provide a switching power supply which can suppress dissipation power to a lower value when viewed from a switching side.

In order to attain the aforesaid object, the switching power supply according to the invention is applied to such a switching power supply which includes an inductor whose one terminal is coupled to a primary side DC power supply and a switching element coupled to the other terminal of the inductor, wherein current flowing through the inductor is switched by using the switching element to obtain a boosted DC output, and the switching element is arranged to further include a rectifying and smoothing circuit coupled to the other terminal of the inductor, and a zener diode coupled to an output of the rectifying and smoothing circuit, wherein an internal resistance on the inductor side viewed through the rectifying smoothing circuit is employed as a serial resistor for generating a voltage drop which is required for the zener diode to absorb voltage fluctuation, thereby to stabilize a voltage of the DC output.

That is, when the voltage of the DC output decreases, the zener diode acts to decrease an amount of the voltage drop generated by the internal resistance on the inductor side viewed through the rectifying and smoothing circuit thereby to prevent the decrease of the voltage of the DC output. Further, when the voltage of the DC output increases, the zener diode acts to increase an amount of the voltage drop generated by the internal resistance thereby to prevent the increase of the voltage of the DC output.

In addition to the aforesaid arrangement, the switching power supply is arranged to further comprise an auxiliary coil magnetically coupled to the inductor, wherein an output of the auxiliary coil is introduced to the switching element thereby to perform a switching operation in the switching element. That is, the inductor, the auxiliary coil and the switching element form a blocking oscillation circuit which performs self-oscillation.

In addition to the aforesaid arrangement, the switching power supply is arranged in a manner that the rectifying smoothing circuit is provided with a n type smoothing circuit. Thus, the ripple component can be removed more efficiently.

In addition to the aforesaid arrangement, the switching power supply is arranged in a manner that the DC output is introduced to a tuning voltage generation circuit for generating a tuning voltage to be supplied to a tuner. That is, the switching power supply provided as a constituent element for a block for generating the tuning voltage can be configured with a simple arrangement wherein the error detection circuit and the serial resistor for the zener diode are eliminated.

In addition to the aforesaid arrangement, the switching power supply is arranged in a manner that a current value flowing through the zener diode is set to be smaller than twice a maximum value of a current flowing through the tuning voltage generation circuit when a load of the DC output is no load, and a current value flowing through the zener diode is set to be larger than 0 also when a current flowing through the tuning voltage generation circuit is maximum. Thus, even if the variance of the elements are expected, merely a small current flows through the zener diode in such a range that the DC output can be stabilized.

DETAILED DESCRIPTION OF THE PREFERRED EMBODIMENTS

The embodiment of the invention will be explained with reference to the accompanying drawings.

Figure 1:
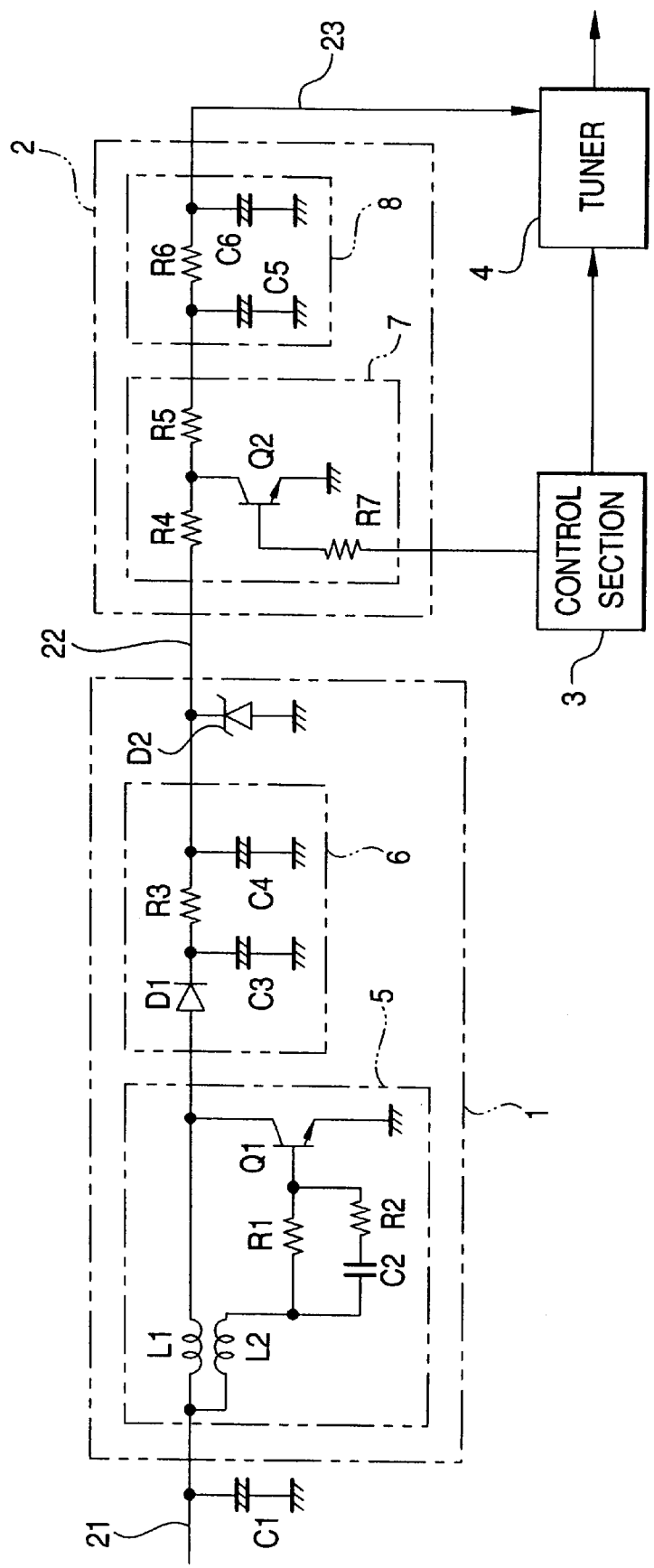
FIG. 1 is a circuit diagram showing the electrical connection of a tuning voltage generation apparatus having the switching power supply according to the embodiment of the invention.
Figure 2:
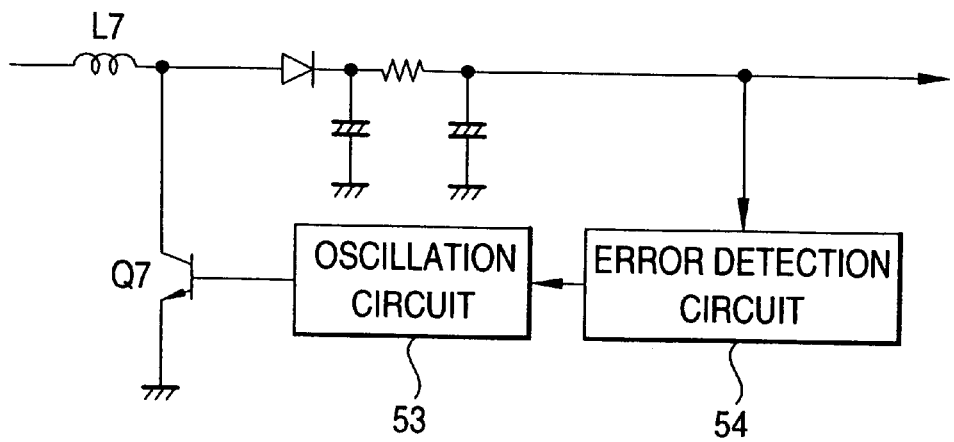
FIG. 2 is a block diagram showing the electrical arrangement of the prior art.
Figure 3:
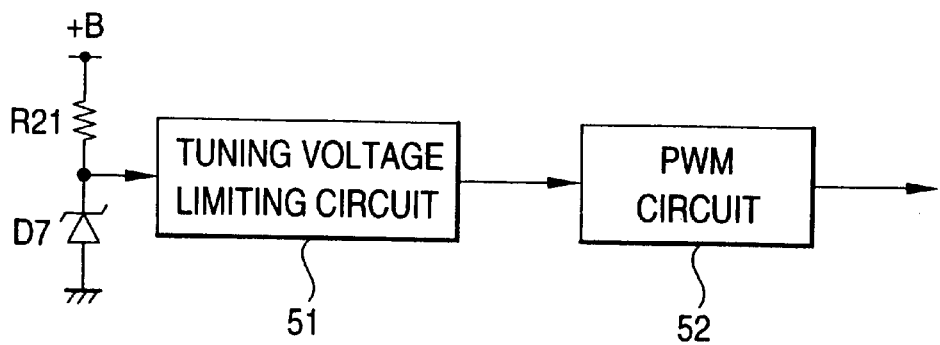
FIG. 3 is a block diagram showing the electrical arrangement of the prior art.

FIG. 1 is a circuit diagram showing the electrical connection of a tuning voltage generation apparatus having the switching power supply according to the embodiment of the invention, whose configuration is briefly divided into a switching power supply 1, a tuning voltage generation circuit 2, a control section 3 and a tuner 4.

In the figure, the switching power supply 1 serves as a switching power supply employing the configuration according to the invention, which generates without using an error detection circuit the stabilized DC output 22 of a voltage slightly exceeding 30 volt that is required when the tuning voltage generation circuit 2 generates the tuning voltage. The tuning voltage generation circuit 2 is a block which is supplied with the DC output 22 outputted from the switching power supply 1, then generates tuning voltage 23 having a voltage according to the output of the control section 3 and outputs the tuning voltage to the tuner 4.

The control section 3 is a block, for controlling a channel received by the tuner 4, which controls the voltage of the tuning voltage 23 generated by the tuning voltage generation circuit 2. Further, the control section controls the frequency of a local oscillation signal generated by the tuner 4. The tuner 4 is a block which amplifies a signal having a frequency set by the tuning voltage 23 and converts the frequency of the amplified signal by using the local oscillation signal having the frequency accorded to the output of the control section 3. Further, the tuner outputs an intermediate frequency signal thus obtained by the frequency conversion to a not-shown intermediate frequency signal amplifier circuit.

The tuning voltage generation circuit 2 will be explained in detail. The DC output 22 of a voltage slightly exceeding 30 volt is applied to the collector of a transistor Q2 through a resistor R4. The collector of the transistor Q2 is coupled to an integration circuit 8 through a resistor R5. The output of the control section 3 is coupled to the base of the transistor Q2 through a resistor R7. The emitter of the transistor Q2 is grounded. Thus, a block 7 formed by the transistor Q2 and the resistors R4, R5 serves as a switching circuit which operates in a manner that a ratio between a period for outputting the DC output 22 to the integration circuit 8 and a period for stopping the output of the DC output 22 to the integration circuit 8 is changed in accordance with the output of the control section 3. The integration circuit 8 is configured as a n type smoothing circuit formed by a resistor R6 and capacitors C5, C6. The integration circuit integrates the pulse-shaped voltage outputted from the switching circuit 7 thereby to generate the tuning voltage 23 serving as a signal for setting the tuning frequency of the tuner 4.

The tuning voltage generation circuit 2 is configured in the aforesaid manner. Thus, the larger the ratio of the period where the transistor Q2 is in an ON state is in order to lower the tuning voltage 23, the larger the dissipation current of the tuning voltage generation circuit 2 becomes. In contrast, the smaller the ratio of the period where the transistor Q2 is in an ON state is in order to increase the tuning voltage 23, the smaller the dissipation current of the tuning voltage generation circuit 2 becomes. The value of the dissipation current thus changed takes the minimum value of several hundred $\mu A$ and the maximum value of about 1.5 mA in a state that the tuner 4 is coupled.

The switching power supply 1 will be explained in detail. A primary side DC power supply 21 of 5 volt is coupled to one terminal of an inductor L1 serving as a main element for boosting. The collector of a transistor Q1 serving as a switching element is coupled to the other terminal of the inductor L1. One terminal of an auxiliary coil L2 magnetically coupled to the inductor L1 is coupled to the primary side DC power supply 21. The other terminal of the auxiliary coil L2 is coupled to the base of the transistor Q1 through a resistor R1 for limiting the base current. The resistor R1 is coupled in parallel to a series circuit formed by a capacitor C2 and a resistor R2 in order to increase the switching speed. The emitter of the transistor Q1 is grounded. A capacitor C1 connected between the primary side DC power supply 21 and the ground level serves as an element for reducing the impedance of the primary side DC power supply 21 viewed from the inductor L1 side.

A block 6 formed by a diode D1, a resistor R3 and capacitors C3, C4 serves as a rectifying and smoothing circuit which rectifies and smooths the voltage generated at the other terminal of the inductor L1 in response to the switching operation of the transistor Q1. The smoothing circuit of the rectifying and smoothing circuit 6 employs a n type smoothing circuit formed by the resistor R3 and the capacitors C3, C4 in order to raise the removing rate of the ripple component. The value of the resistor R3 is set about 100 Ω.

A zener diode D2 connected between the output of the rectifying and smoothing circuit 6 and the ground level serves as an element for stabilizing the voltage of the DC output outputted from the rectifying and smoothing circuit 6 to a voltage slightly exceeding 30 volt. That is, since the internal resistance of a block 5 viewed through the rectifying and smoothing circuit 6 is employed as a serial resistor for generating the voltage drop which is required for the zener diode D2 to absorb the voltage fluctuation, whereby the voltage of the DC output 22 is stabilized.

Preferably, an alternating voltage of about 5 volt is applied to a point between the diode D1 and the resistor R3.

The switching power supply 1 is configured in the aforesaid manner. The dissipation current of the tuning voltage generation circuit 2 changes in a range from several hundred μA to about 1.5 mA. Thus, when it is arranged that no load is coupled to the DC output 22, the current value flowing through the zener diode D2 is set to be about twice (3 mA) the maximum dissipation current of the tuning voltage generation circuit 2. Accordingly, when the dissipation current of the tuning voltage generation circuit 2 changes in the range from several hundred μA to about 1.5 mA, the current value flowing through the zener diode D2 changes in a range between a value obtained by decreasing several hundred μA from 3 mA and a value obtained by decreasing 1.5 mA from 3 mA. As a result, even when there is variance in each of the elements such as the inductance L1, the transistor Q2 etc., since the minimum value of the current flowing through the zener diode D2 becomes larger than 0, the voltage of the DC output 22 can be always stabilized.

The value of the resistor R3 constituting the n type smoothing circuit is about 100 Ω as described above, so that the power loss at the resistor R3 is small. Such a value of this resistor is a value for the resistor to be able to act as an element of the n type smoothing circuit for removing the ripple component. However, since the current flowing through the resistor is about 3 mA, an amount of the voltage drop thereof is small, so that the resistor R3 does not act as a serial resistor for causing such a voltage drop necessary for the zener diode D2 to absorb the voltage fluctuation.

The operation of the embodiment thus configured will be explained.

When the current flows through the inductor L1, the auxiliary coil L2 generates the voltage for turning on the transistor Q1. Thus, the block 5 formed by the inductor L1, the auxiliary coil L2, the resistors R1, R2 and the capacitor C2 constitutes a blocking oscillation circuit thereby to oscillate at a frequency determined by the values of the elements. Accordingly, if there is no zener diode D2, an unstable voltage obtained by boosting the voltage of the primary side DC power supply 21 appears at the output of the rectifying and smoothing circuit 6.

In contrast, when viewing the inductance L1 side through the rectifying and smoothing circuit 6 from the zener diode D2 side, there appears an internal resistance within the blocking oscillation circuit 5. The value of this internal resistance is set to a value (for example, several KΩ etc.) capable of generating such a voltage drop necessary for the zener diode D2 to absorb the voltage fluctuation (the value of the internal resistor can be changed easily by changing the value of the resistor R1). Thus, the zener diode D2 changes an amount of the voltage drop caused by the internal resistance (that is, changes the current flowing through the zener diode D2) even when the dissipation current of the tuning voltage generation circuit 2 changes, thereby to stabilize the voltage of the DC output 22 to a value slightly exceeding 30 volt.

The control section 3 sets the local oscillation frequency of the tuner 4 in correspondence with the frequency of a received channel. Further, the control section 3 repeatedly turns on and off the transistor Q2 at a ratio corresponding to the frequency of the received channel. Thus, the tuning voltage generation circuit 2 is supplied with the DC output 22 thus stabilized to the voltage slightly exceeding 30 volt as the operation power supply to generate and output the tuning voltage 23 having the voltage corresponding to the frequency of the received channel. Accordingly, the tuner 4 outputs the intermediate frequency signal obtained by receiving the broadcast signal of the received channel.

As described above, the resistor R3 within the rectifying and smoothing circuit 6 is the element which does not act as a serial resistor when viewed from the zener diode D2. Thus, it is possible to eliminate both the resistor R3 and the capacitor C4 in the case of supplying the current to such a load which is not required to suppress the ripple component largely.

The inductor L1 and the auxiliary coil L2 may be a pair of coils which are magnetically coupled to each other. Thus, the inductor and the auxiliary coil may be coils which are wound separately. Alternatively, the inductor and the auxiliary coil may be formed by a single coil in a manner that a tap is provided at a portion of the coil thereby to form a portion from the tap to one end of the coil as the inductor L1 and a portion from the tap to the other end of the coil as the auxiliary coil L2.

Although the explanation has been made as to the case where the switching power supply 1 is arranged to supply the DC output 22 to the tuning voltage generation circuit 2, the switching power supply can also be applied to the case where the switching power supply supplies the DC output to other arbitrary load.

As described above, the switching power supply according to the invention is applied to such an arrangement that the current flowing through the inductor is switched by using the switching element to obtain the boosted DC output, and the switching element is arranged to further include the rectifying and smoothing circuit coupled to the other terminal of the inductor, and the zener diode coupled to the output of the rectifying smoothing circuit, wherein the internal resistance on the inductor side viewed through the rectifying smoothing circuit is employed as the serial resistor for generating the voltage drop which is required for the zener diode to absorb voltage fluctuation, thereby to stabilize the voltage of the DC output. Thus, when the voltage of the DC output changes, this change is absorbed by the change of the voltage drop generated by the internal resistance on the inductor side viewed through the rectifying smoothing circuit, whereby it becomes possible to stabilize the output voltage by using only the zener diode without using the serial resistor in the arrangement eliminating the error detection circuit.

Further, the switching power supply according to the invention is arranged to further comprise the auxiliary coil magnetically coupled to the inductor, wherein the output of the auxiliary coil is introduced to the switching element thereby to perform a switching operation in the switching element. Thus, the inductor, the auxiliary coil and the switching element form the blocking oscillation circuit which performs self-oscillation. Accordingly, it becomes possible to simplify the circuit arrangement of the block for performing the switching operation in the switching element.

Further, the switching power supply according to the invention is arranged in a manner that the rectifying smoothing circuit is provided with the n type smoothing circuit. Thus, since the ripple component can be removed more efficiently, it becomes possible to sufficiently reduce the ripple component of the DC output.

Further, the switching power supply according to the invention is arranged in a manner that the DC output is introduced to the tuning voltage generation circuit for generating the tuning voltage to be supplied to the tuner. Thus, the switching power supply provided as a constituent element for the block for generating the tuning voltage can be configured with a simple arrangement wherein the error detection circuit and the serial resistor for the zener diode are eliminated, so that it becomes possible to simplify the arrangement of the block for generating the tuning voltage.

Further, the switching power supply according to the invention is arranged in a manner that a current value flowing through the zener diode is set to be smaller than twice the maximum value of a current flowing through the tuning voltage generation circuit when a load of the DC output is no load, and a current value flowing through the zener diode is set to be larger than 0 also when a current flowing through the tuning voltage generation circuit is maximum. Thus, even if the variance of the elements is expected, merely a small current flows through the zener diode in such a range that the DC output can be stabilized, so that it is possible to suppress the dissipation power viewed from the switching side to a small value.

What is claimed is:

1. A switching power supply circuit, comprising:

an inductor having a first terminal coupled to a DC power supply, a switching element coupled to a second terminal of said inductor, a rectifying and smoothing circuit coupled to said second terminal of said inductor; and a zener diode coupled to an output of said rectifying and smoothing circuit, an auxiliary coil magnetically coupled to said inductor, wherein current flowing through said inductor is switched by using said switching element to obtain a boosted DC output, wherein an internal resistance of said circuit on said inductor side viewed through said rectifying and smoothing circuit is employed as a serial resistor that generates a voltage drop required for said zener diode to absorb voltage fluctuations to stabilize a voltage of the boosted DC output, and wherein an output of said auxiliary coil is introduced to said switching element to perform a switching operation in said switching element.

2. The switching power supply according to claim 1, wherein said rectifying smoothing circuit comprises a n type smoothing circuit.

3. The switching power supply according to claim 2, wherein said rectifying smoothing circuit further comprises a resistor.

4. The switching power supply according to claim 3, wherein said resistor causes an alternative voltage of about 5 volt.

5. The switching power supply according to claim 1, wherein said DC output is introduced to a tuning voltage generation circuit for generating a tuning voltage to be supplied to a tuner.

6. The switching power supply according to claim 5, wherein a current value flowing through said zener diode is set to be smaller than twice a maximum value of a current flowing through said tuning voltage generation circuit, when a load of said DC output is no load, and a current value flowing through said zener diode is set to be larger than 0, also when a current flowing through said tuning voltage generation circuit is maximum.

* * * * *